United States Patent [19]
Alberti

[11] 3,741,508
[45] June 26, 1973

[54] CARGO HANDLING SYSTEM SIDE LOCKING DEVICE

[75] Inventor: John Alberti, Seattle, Wash.
[73] Assignee: The Boeing Company, Seattle, Wash.
[22] Filed: May 6, 1971
[21] Appl. No.: 140,771

[52] U.S. Cl. .................... 248/119 R, 248/361 R
[51] Int. Cl. .............................................. B60p 7/08
[58] Field of Search .................... 248/119 R, 361 R; 244/118 R; 292/169, 139, DIG. 49; 105/366 D, 366 B, 366 C

[56] References Cited
UNITED STATES PATENTS

| | | | |
|---|---|---|---|
| 1,703,249 | 2/1929 | Schrader | 292/DIG. 49 |
| 2,293,402 | 8/1942 | Parsons | 292/DIG. 49 |
| 1,238,042 | 8/1917 | Moore | 292/139 |
| 3,429,536 | 2/1969 | Petry | 105/369 A X |
| 3,159,111 | 12/1964 | Gutridge | 105/366 B X |
| 3,465,998 | 9/1969 | Ginn | 248/361 |
| 2,047,956 | 7/1936 | Fitch | 105/366 B |
| 3,424,410 | 1/1969 | Galaup | 244/118 R |

FOREIGN PATENTS OR APPLICATIONS 688,665   3/1953   Great Britain ..................... 292/139

Primary Examiner—Edward C. Allen
Attorney—Glenn Orlob, Kenneth W. Thomas and Nicolaas De Vogel

[57] ABSTRACT

A cargo handling system for carriers but specifically for aircraft incorporating an automatic guide and restraint device which is utilized in cooperation with a side manually adjustable fore/aft locking device with a slaved vertical restraint device.

During cargo loading operations, the system, by the use of a conveyor arrangement inclusive of a cargo propulsive means allows the approximate positioning of a cargo carrying means, which means triggers automatically the engagement of the center guide restraint devices; thereafter, the approximate manually aligning and subsequent locking of the side fore/aft locking devices and thereon engagement of connected slaved vertical restraint devices is accomplished; however, the securing of the carrying means incorporates limited freedom so that the carrier structure is independently flexible from the cargo carrying means.

During cargo unloading operations, manual disengagement of the side fore/aft locking devices and activation of the cargo propulsive means will move the cargo carrying means towards the exit and upon movement the cargo carrying means will automatically disengage the center guide device's restraints and the slaved vertical restraint devices.

The center guide restraint device carries spring-loaded restraint lips, mounted on a slidingly positioned body, which lips swing into pockets provided in the cargo carrying means and travel with the pocket for a given stroke length. When the stroke length is surpassed, the lip pivots out of the pocket and the slideable body recycles to its original position.

The side lock is adjustable in fore and aft direction and is manually aligned and engaged with a pocket of the cargo carrying means. The slaved vertical restraint device follows exactly the alignment and provides for simultaneous engagement into a next pocket.

3 Claims, 23 Drawing Figures

PATENTED JUN 26 1973
3,741,508
SHEET 1 OF 9
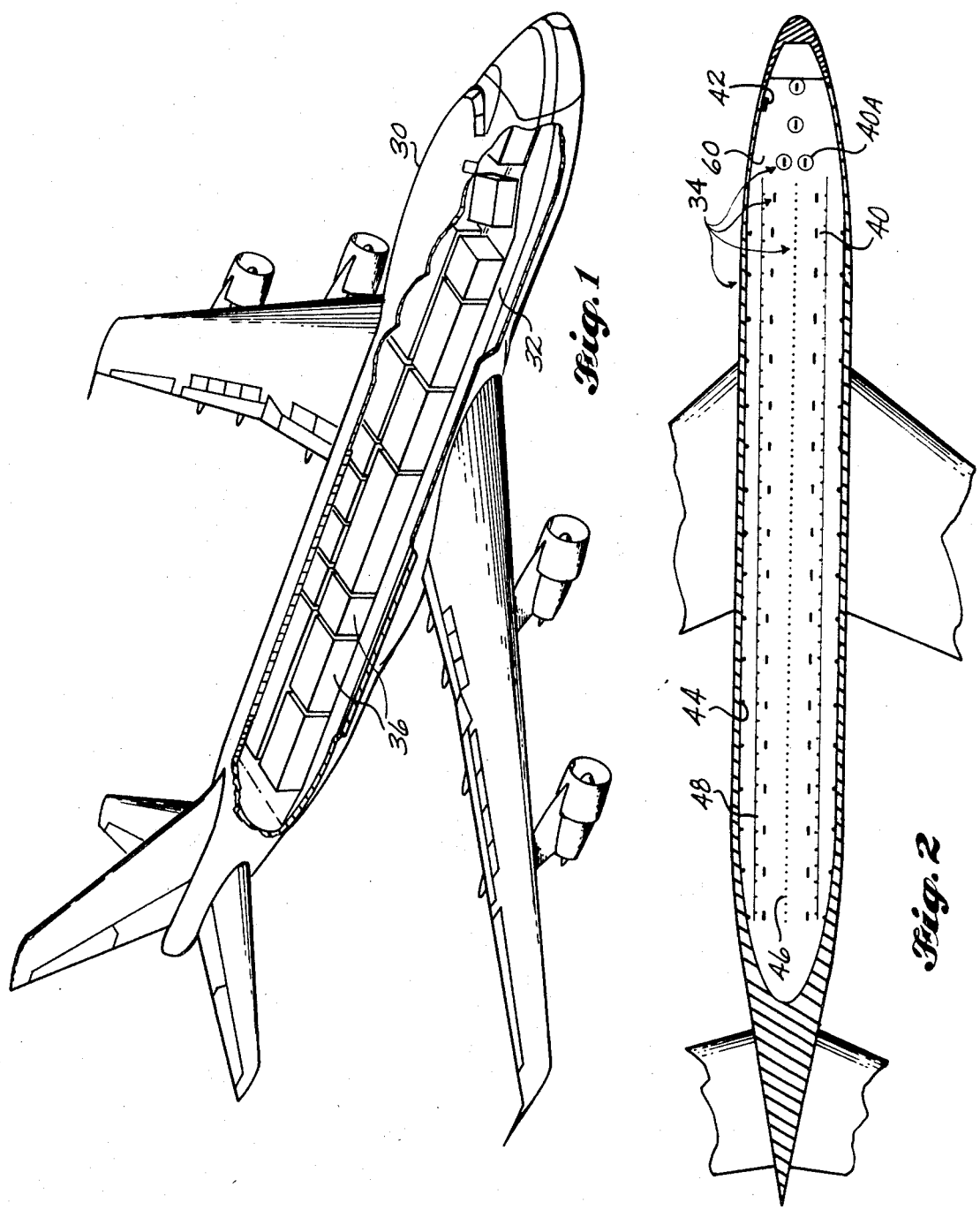
INVENTOR
JOHN ALBERTI
BY
AGENT 3,741,508

INVENTOR
JOHN ALBERTI
AGENT

INVENTOR
JOHN ALBERTI
AGENT

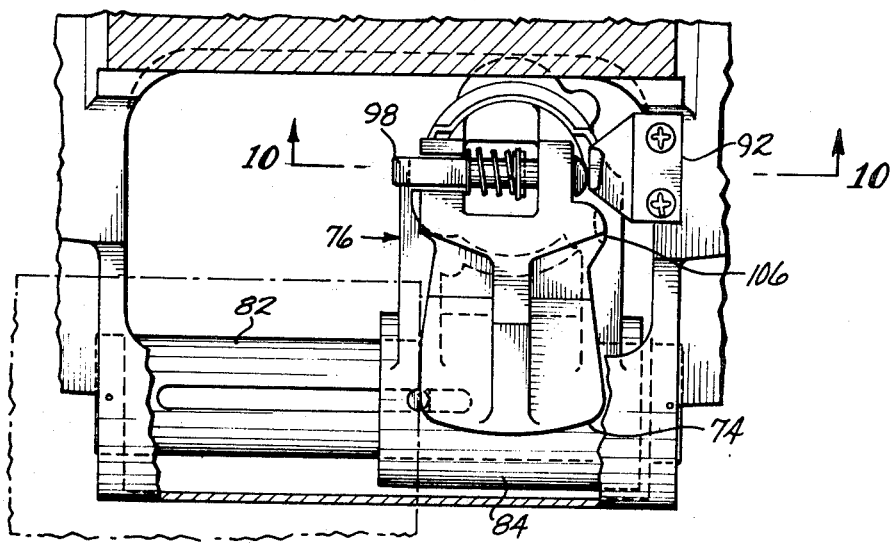
Fig. 9
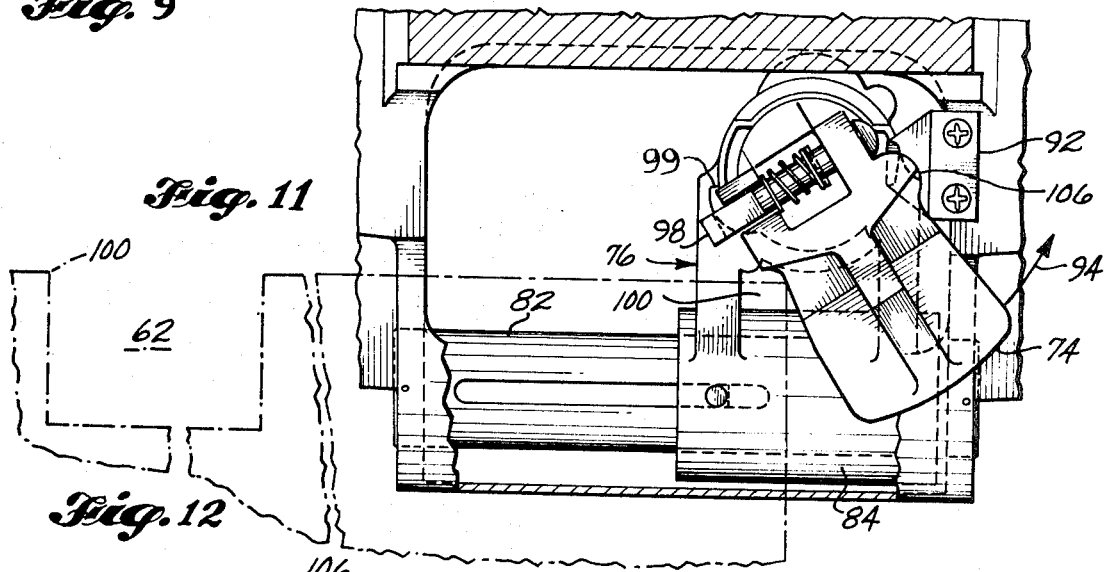
Fig. 11
Fig. 12
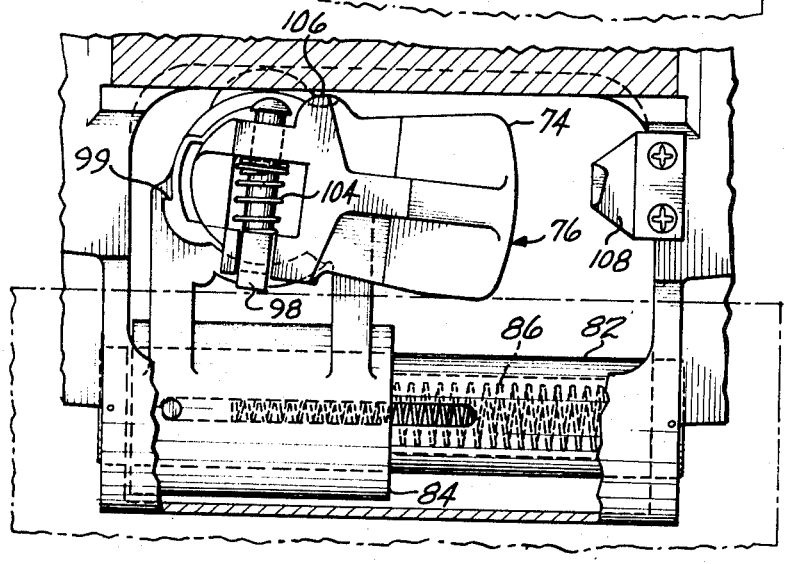
INVENTOR
JOHN ALBERTI
AGENT

INVENTOR
JOHN ALBERTI

AGENT

INVENTOR
JOHN ALBERTI

BY
AGENT

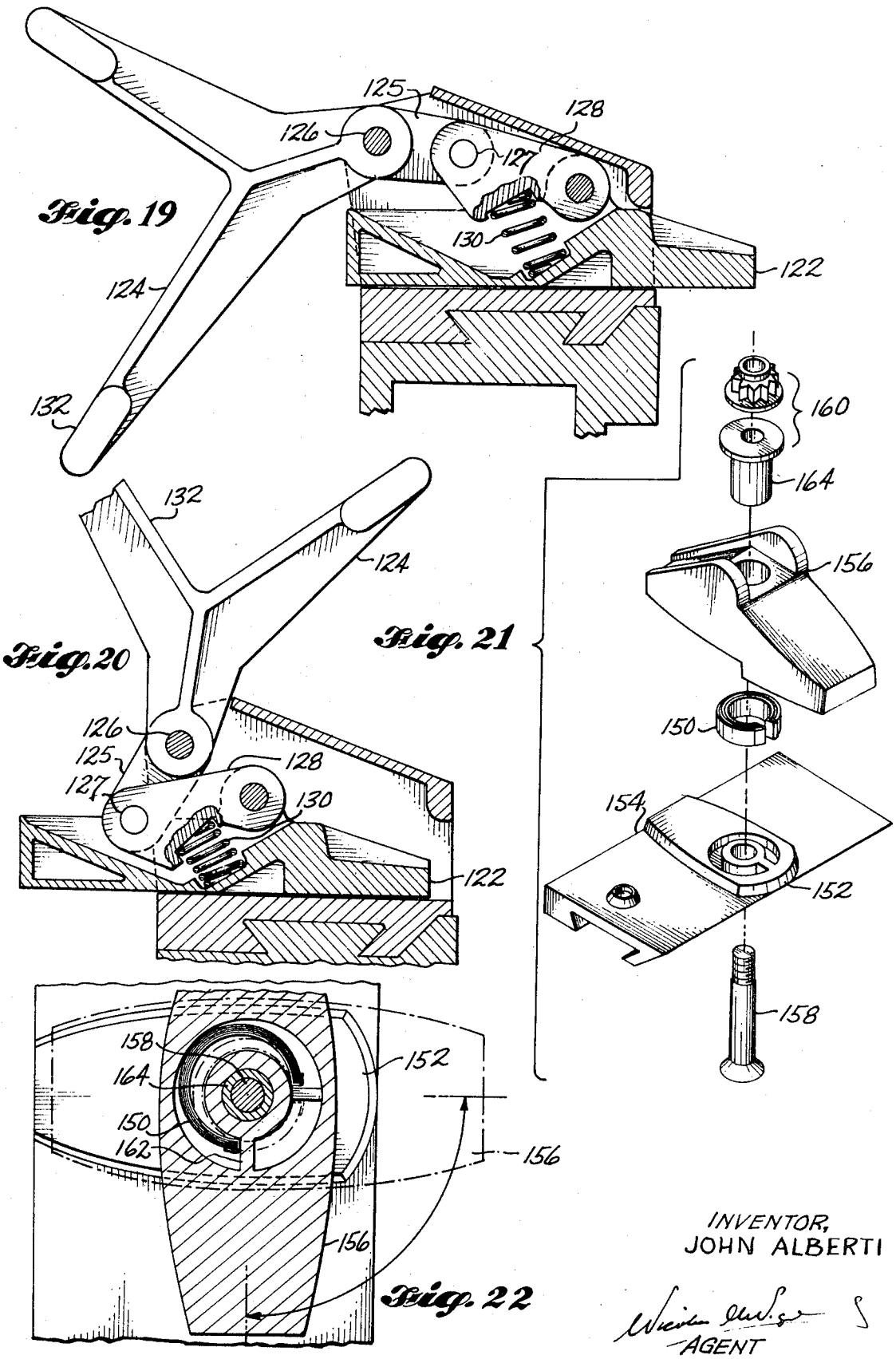

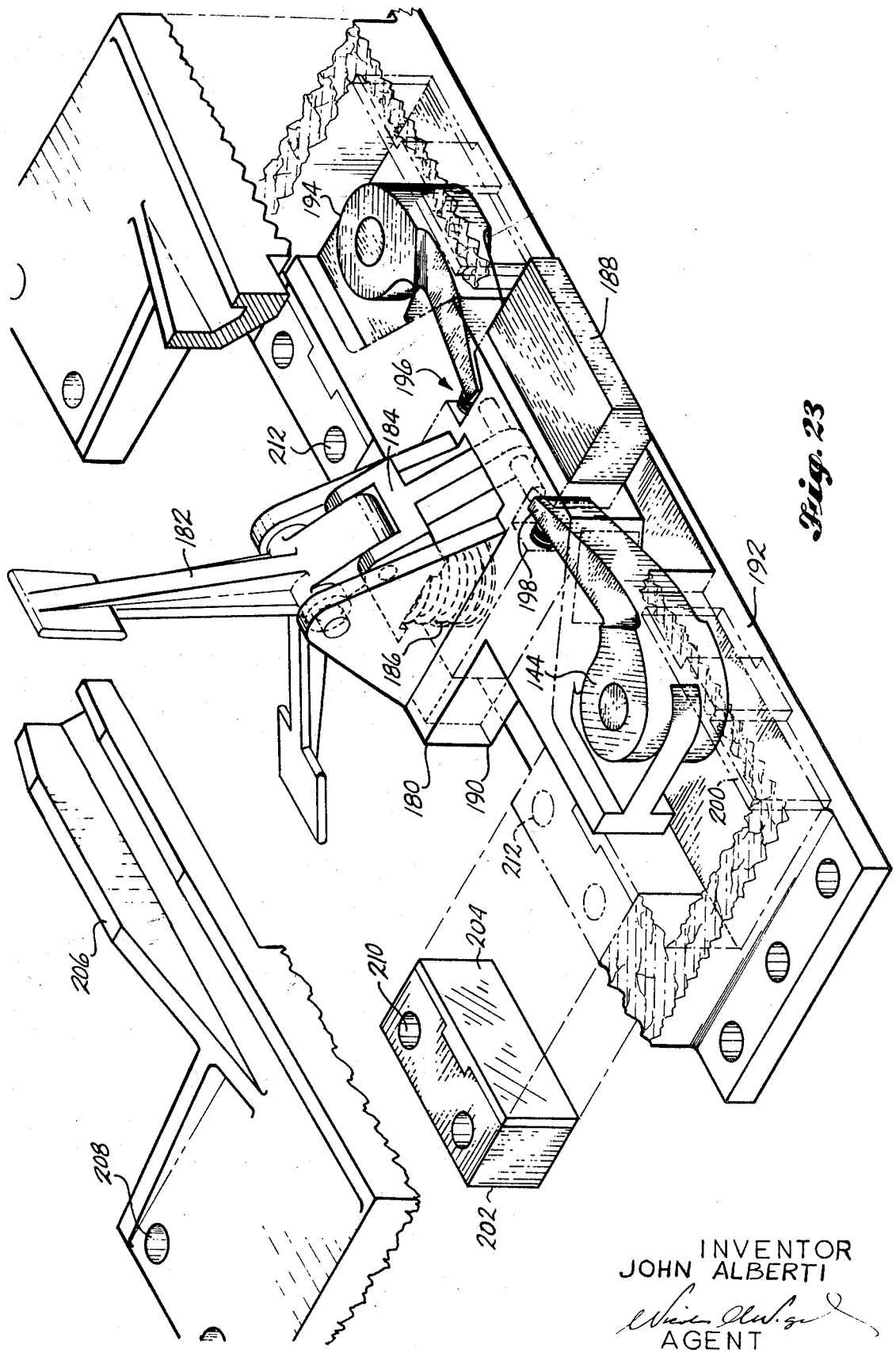

CARGO HANDLING SYSTEM SIDE LOCKING DEVICE

BACKGROUND OF THE INVENTION

1. Field of the Invention

This invention relates to cargo handling apparatus, and, more particularly, to a manual and adjustable side locking device for securing cargo carrying means positioned in freighter aircraft.

2. Prior Art

The system of loading and unloading cargo carrying means, such as containers, pallets, etc., as disclosed hereinafter, was specifically designed and developed for jumbo type aircraft freighters such as the Boeing 747C and 747F.

For instance, the 747F is a four-engine land based jet airplane for the transportation of cargo with essentially identical crew handling and servicing characteristics with 747's now in service. Its wide body allows side-by-side arrangement of 8 foot by 8 foot cross section cargo modules in the body constant section. Straight-in nose loading and an automated cargo handling system accommodates efficiently and expeditiously all of today's existing pallets and containers, as well as tomorrow's anticipated standardized cargo modules.

The enormous carrying capacity of such large aircraft increases the degree and magnitude of problems in loading, securing and unloading cargo. A major problem resides in the fact that the conventional freight securing practices do not provide the required structural flexibility to the large aircraft because the conventional tie-down practices made the body and its 40-foot containers appear as one integrally formed stiff structure. As explained hereinafter, the present invention provides for independent flexibility for aircraft bodies while loaded with cargo containers.

Another problem resides in the fact that the expense of the aircraft, its size and its maintenance cost are such that economic utilization can only be achieved when loading, securing and unloading are accomplished at a minimum of time by a minimum use of labor.

The present airplane is designed to carry 260,000 to 340,000 pounds in cargo. Most of the cargo moves by surface transportation and, apart from individual packages and crates, the containers most commonly used are "eight by eights;" that is, 8 feet wide, 8 feet high, and of various lengths, 10, 20, 30 or 40 feet length. The 747F is unique amount commercial carriers in its ability to accept containers up to 8 X 8 X 40 ft. size. In addition the 747F can handle any of the existing pallets and containers in air cargo use today as well as cargo of unusual sizes and lengths. Depending on type pallet or container used, cabin volume will range from 18,000 to 20,000 cu. ft.

Consequently, existing aircraft cargo tie-down systems cannot be used, since the size and the type of aircraft did not exist in the past and, as a result, the requirements are more severe and the economic operating considerations different.

Since the present disclosed system utilizes specially designed components, it will also be obvious that these components are not existent in the conventional cargo tie-down hardware field or prior art.

SUMMARY AND ADVANTAGES OF THE INVENTION

As mentioned, the inherent problems of cargo handling of jumbo jets are many; however, the most serious are economics and safety requirements.

The present invention has been designed, developed and proven to load and secure 260,000 to 320,000 pounds of containerized cargo, by a two-man operation, within 22 minutes, and to release and unload 260,000 to 320,000 pounds by a two-man operation within 23 minutes.

In other words, a two-man crew can load and unload a jumbo jet in a total time of 47 minutes, a turn around time which is better than used for the cargo handling of average-size airplanes.

The securing requirements are within the F.A.A. set rules; however, the method of securing is very unorthodox and unconventional because none of the containers are rigidly secured as customary but rather are slightly movably secured.

It became evident that fast loading and fast unloading may be achieved if a less precise positioning of the container to the floor-mounted tie-down devices could be developed. Furthermore, it became evident that as a result of such a system, a tolerance or lateral play may exist. It was further learned that the small amount of give or freedom potential is advantageous to each container and still does not harm the over-all securing. One of the major advantages resides in maintaining normal airplane body flexibility because the cargo should not become part of the body structure through tight securing which would stiffen the over-all body structure. Thus, a slight amount of play for each container is desirable. A potential break-away danger requires a much larger shift of the cargo container in order to accelerate a large enough force that would permit the container to break away from the locking devices.

More time was saved by making the tie-down automatic wherever possible and at the most cumbersome or inaccessible areas. The center automatic guide restraint device allows a minimum distance of space between two side-by-side positioned containers in the aircraft so that the loading volume is used to its utmost capacity, and, furthermore, the center guide restraint device automatically restrains the container in "up" directions besides the provided lateral guiding function.

This automatic locking or tie-down of the containers is at the center line of the aircraft with the inboard side of the container. A two-man crew, comprising a master loader and a loader, will operate the system. The master loader receives the incoming cargo container and automatically conveys it toward the loader. The loader's time is used to roughly position the container at a certain location by use of the power drive conveying arrangement and then to manually adjust and lock the side fore/aft locking devices at the outboard side of the container only. Thereafter he will move to a next station for positioning the next arriving container at an approximate tie-down location, and so on.

In summary, the present invention comprises an almost completely automatic cargo handling system featuring a power drive system which engages with the cargo containers at the threshold or sill of the nose cargo door and positions said cargo in a double row along the deck by a series of powered pneumatic drive wheels and guide rails over a surface of casters and rollers.

A master loader directs the entering of the container from a master control panel at the nose entrance, and his assistant or the loader positioned at the main deck outboard area (left or right side) directs the positioning of the container from one of the many apart-located local control stations. Thereafter he manually locks the outboard locking devices only; the inboard or center restraints and the slaved vertical restraint devices engage automatically.

It is an important object of the present invention to provide for a cargo handling system which is fast and safe for aircraft by loading, securing, unsecuring and unloading by reason of automation and approximately locating and securing, with limited freedom, cargo carrying means while maintaining independent aircraft body flexibility.

It is also an object of the present invention to provide for a cargo loading and unloading system for aircraft utilizing a system of approximate positioning with automatic vertical tie-down means and manual vertical and horizontal tie-down means.

It is a further object of the present invention to provide for a cargo handling system having center automatic guide restraint devices utilizing slidable automatic engaging and disengaging restraint means.

It is an additional object of the present invention to provide for a cargo handling system having manual side-locking means at outboard cargo tie-down locations, utilizing a slaved vertical restraint.

Other objects and advantages of the present invention will become apparent from the following description taken in conjunction with the accompanying drawings.

BRIEF DESCRIPTION OF THE DRAWINGS

FIG. 1 is a perspective view of a cargo aircraft. The cut-away body portion shows the locations and arrangement of the cargo containers secured on the main deck.

FIG. 2 is a plan view of the main deck of a freighter airplane equipped with the restraint devices necessary for the present cargo handling system.

FIG. 9 is a plan view of part of the device shown in FIG. 6 and wherein the slidable restraining lip is in a moved-over location where the disconnection of the anti-rotational lip mechanism occurs.

FIG. 11 is a plan view of the restraining lip, partly rotated about a delay cam towards a fully restracted position for recycling.

FIG. 12 is a plan view of the restraining lip in the fully retracted and recycled position.

FIG. 19 is a sectional view of the fore/aft locking device in an unlocked or disengaged position.

FIG. 20 is a sectional view of the fore/aft locking device in a locked or engaged position.

FIG. 21 is an exploded view of the slaved restraining device.

FIG. 22 is a plan view of the spring used in the restraining lip of the slaved restraining device.

FIG. 23 is a second embodiment of the manually adjustable fore/aft locking device incorporating automatic floor mounting means.

DESCRIPTION AND OPERATION OF THE INVENTION

Figure 3:
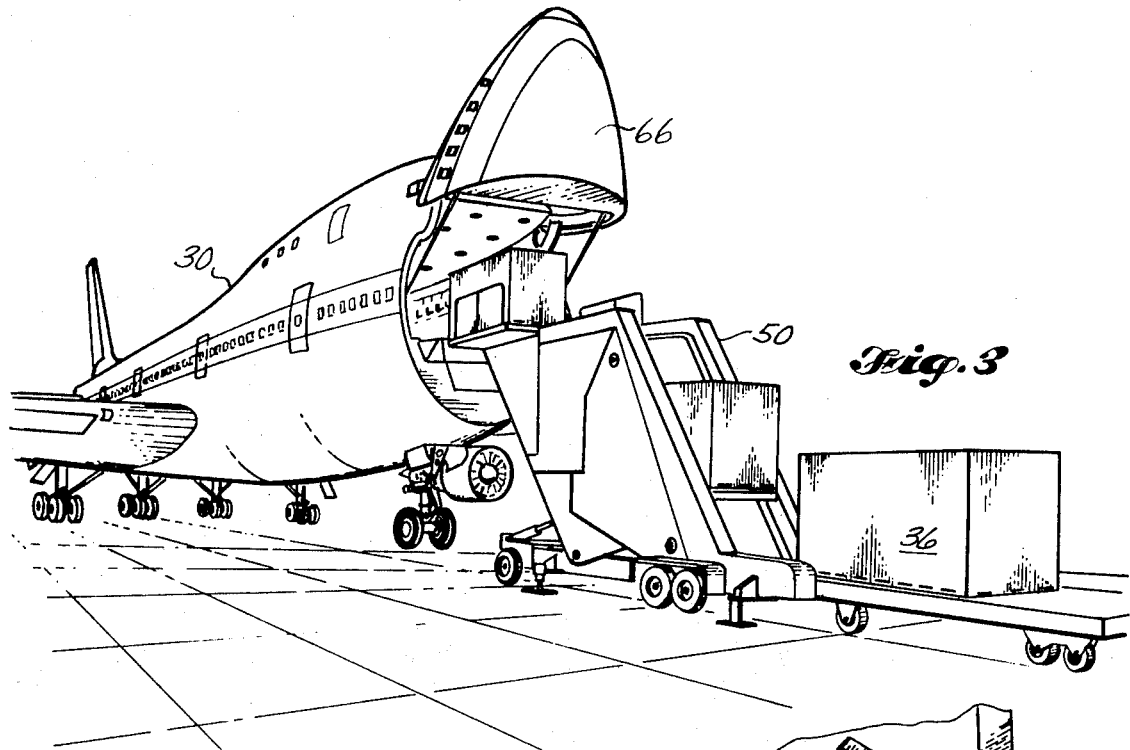
FIG. 3 portrays perspectively a continuous stream of containers being loaded on the main deck.

The cargo handling system involves a novel loading, positioning, mounting, unmounting and unloading method for cargo containers in airplane freighters. The uniqueness of the system is made possible by incorporation of the various mounting components. Therefore, the following explanation made in conjunction with the accompanying exemplary drawings uses like reference numerals throughout in order to designate corresponding parts.

As illustrated in FIG. 1, the freighter airplane 30 has a main deck 32 which is equipped with a variety of cargo-handling means 34, as shown in the plan view of FIG. 2, for moving, positioning and securing the various sizes of containers 36.

The cargo-handling means includes the powered conveyor drive wheels 40, which are controlled electrically by a main control panel 42 and local control panels 44, automatic vertical restraining and guiding means 46 located along the center axis of the freighter 30 and manual side-locking means 48 mounted at each outboard side of the main deck 32.

Figure 4:
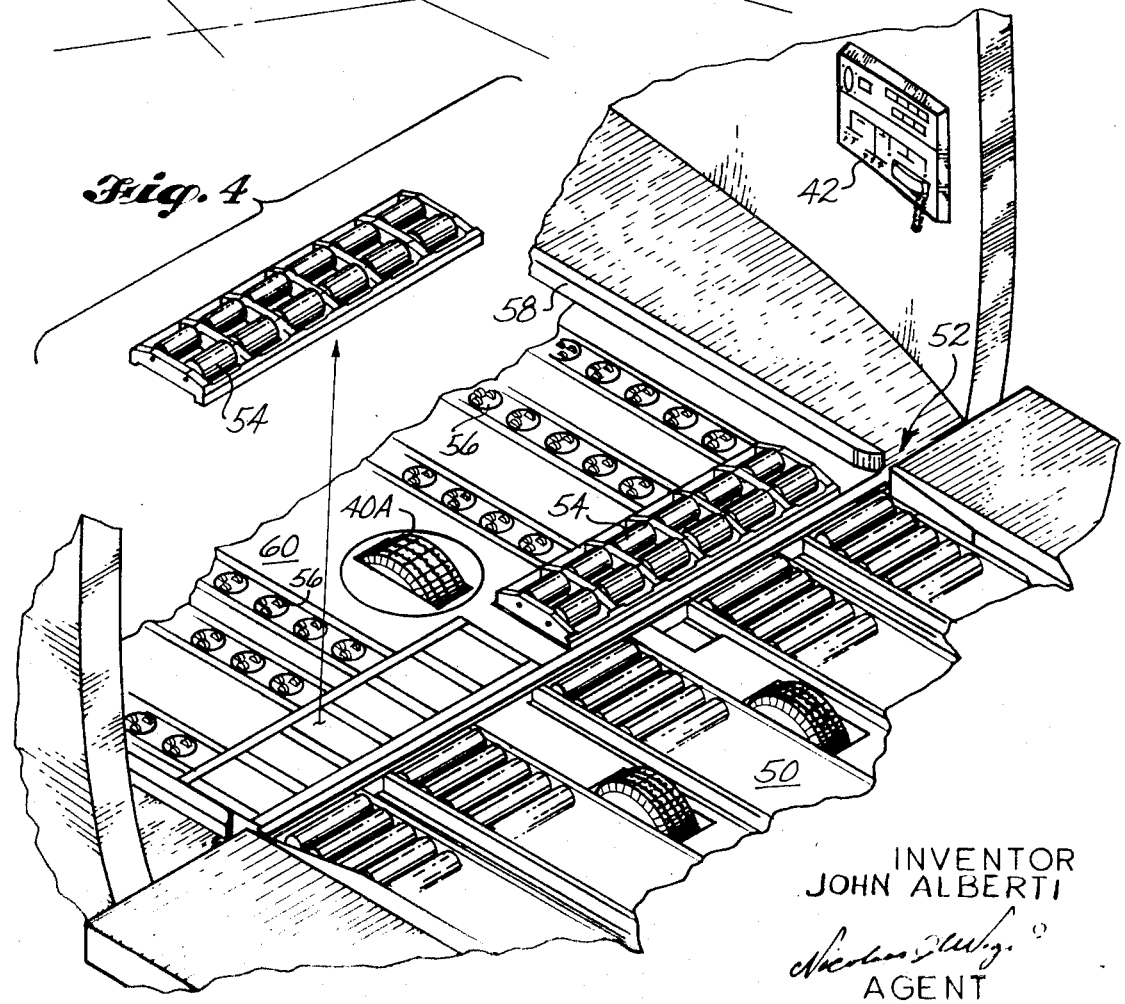
FIG. 4 shows the entry or nose door sill arrangement and part of the cargo receiving main deck area.

Conventional and specially designed cargo ground handling equipment 50, such as shown in FIG. 3, provided with automatic elevating and conveying means, accomplishes expediently in or output flow of cargo containers to or from the freighter door sill 52. The door sill area is provided with rollers 54, spring loaded shock absorbing casters 56 mounted in trays and guide rails 58 for moving the container 36 in a smooth, uninterrupted tempo towards its required destination. As illustrated in FIG. 4, the main control panel 42 is located at the entrance or door sill area so that the master loader can control the rate of the in or out-moving containers 36. In addition, it should be pointed out that the first group of powered conveyor drive wheels are capable of rotation about a vertical axis; thus, in other words, incoming containers 36 can be directed towards the right or left outboard side on the main deck 32. This group of powered conveyor drive wheels 40 are indicated as powered conveyor nose section drive wheels 40A and are located at the nose section 60 of the freighter 30.

Figure 5:
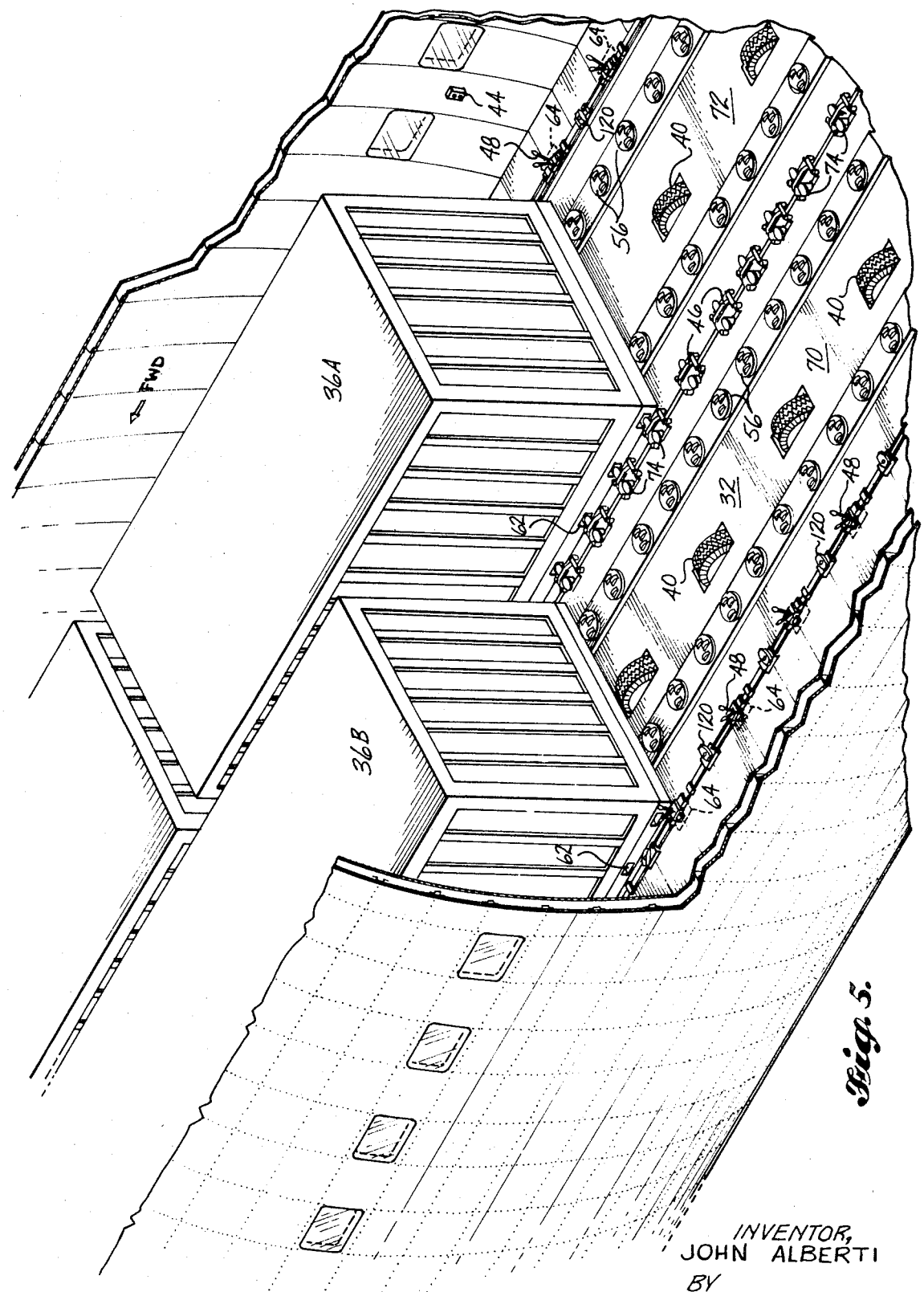
FIG. 5 is a perspective close-up of part of the airplane freight deck with cargo containers mounted and being moved into position.

The loading system for containers 36 in the freighter 30 comprises the steps of receiving the cargo container 36 through the airplane nose door opening or sill 52 and turning the container by means of the rotationally powered drive wheels 40A towards the required outboard lane and continuing the powered drive wheels 40 to propel the container 36 towards the required securing location by stopping the powered drive wheels 40 (see FIG. 5).

Since the speed and also the payload weight of each container 36, as well as the length, and to some degree its momentum, varies, it will not always be possible to park a container at an exact, precise location. Therefore, the stopping of the drive wheels 40 will cause a slight variation of the intended position of the container. Thus, approximate positioning of the container 36 is inherent to the system and subsequently an adjustable securing means enhances a speedier securing or handling of the cargo.

The unloading of the containerized cargo from the freighter 30 comprises the same steps as loading but in reverse order. First the manual adjustable side-locking means 48 are disconnected by the assistant of the master loader; upon clearance from the master loader, the assistant will activate a switch on a local control panel 44 nearest the container 36, for energizing the powered drive wheels 40 and subsequently the container 36 will move towards the exit area or door sill 52. The various automatic restraining and guiding means 46 will automatically disconnect through and by the movement of the container 36. The master loader will activate the powered drive wheels 40 which activation will also move the power drive wheels 40A in the nose section 60 towards the correct angle for properly directing the moving container towards and out of the door sill 52.

The approximate positioning (spotting or parking within the target area 64) of the container 36 is one of the most important and essential steps in the present cargo handling system and comprises mainly the rough aligning of the cargo container 36 pocket 62 within a target area 64 indicated at various locations along the outboard area on the main deck 32. Because the length of the pocket 62 is substantially shorter than the length of the target area 64, positioning of the pocket within the target area is quite simple for the assistant loader. Now, the asistant loader will align the manual side-locking means 48 with the pocket 62 and lock the locking means 48 into the pocket 62. Thereafter he will move to the next manual side-locking means 48 and connect this one in the same manner, and so on until all manual side-locking means 48 next to the to-be-secured container 36 have been connected. After the connection of the last manual side-locking means 48 with the container 36, the assistant loader will find himself at the place of docking for the next incoming container 36 and he will also be close enough to a local control panel 44 to control and stop the next incoming container 36 within a next target area 64. It can thus be visualized that the assistant loader starts his loading by positioning the first incoming container 36 at the rear location on the main deck 32 (nearest the tail section of the freighter 30) and successively walks forward while securing one container after another at a right 70 or a left outboard lane 72 until the assistant loader will arrive at the nose section 60 and conclude the loading of the last container 36 within the nose section area 60 where the master loader is positioned at the main control panel 42. When all cargo is loaded, the master loader will close by means of control 42 the hatch or nose 66 of the freighter 30.

Referring further to FIG. 5, there is shown an actual situation where containers are in a secured position in lane 72 of the freighter 30 while a container is being moved in a loaded position in the other outboard lane 70. The secured container 36A in the lane 72 is secured in the vertical direction by means of the lips 74 of the automatically restraining and guiding means 46. The container 36B is assumed to be moving and the restraining lips 74 are moving along within their individually allowed stroke length and thus still in a pocket-searching status.

As mentioned before, the securing of the containers 36 along the center axis of the freighter 30 is completely automatic but only for the vertical direction by the automatic vertical restraining and guiding means 46. This automatic securing method provides for the closest positioning of the containers between the two lanes (approximately four inches) so that the cargo volume in the freighter 30 is used most efficiently and economically and also the automatic securing method solves the securing of the inaccessible area of the side-by-side positioned containers.

Figure 6:
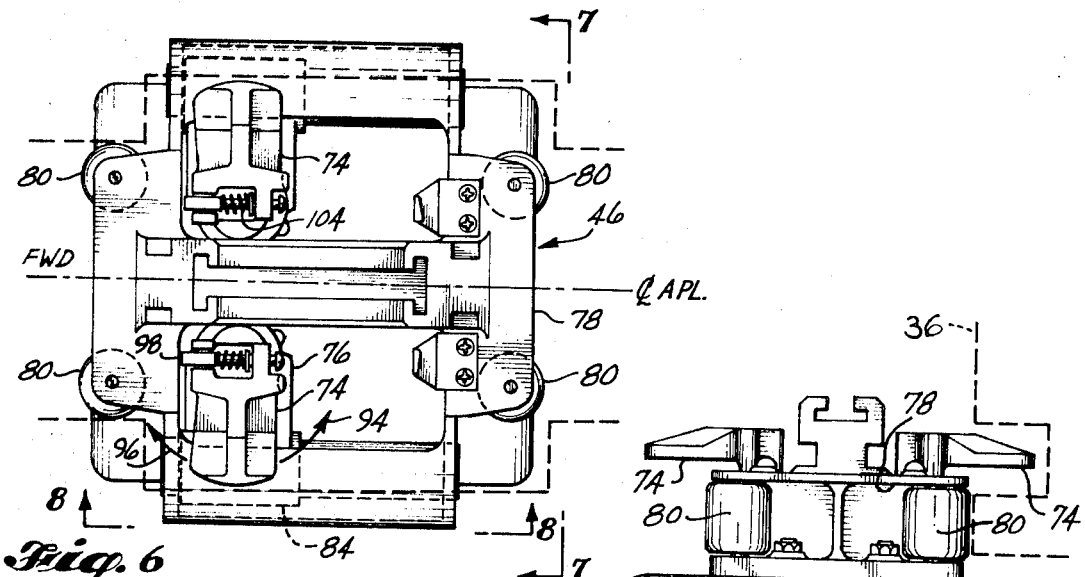
FIG. 6 is a plan view of the automatic vertical restraint device used along the longitudinal center axis of the freight deck.
Figure 7:
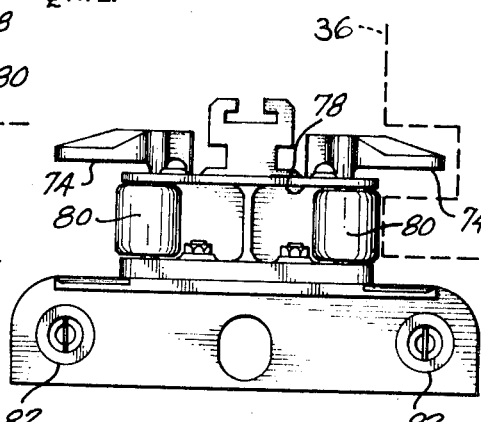
FIG. 7 is a side view taken from FIG. 6 along line 7—7.
Figure 8:
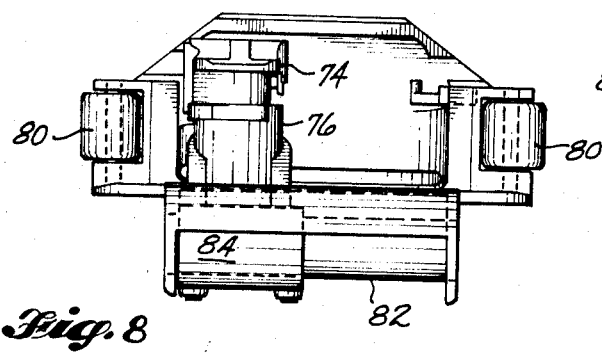
FIG. 8 is a side view taken from FIG. 6 along line 8—8.

In order to explain the operation of the automatic restraining and center guiding means 46, attention is directed to the FIGS. 6 through 15. As mentioned, FIG. 6 is a plan view of the automatic restraining and guiding means 46 and is provided with a pivotally and slidably mounted restraining lip arrangement 76 carrying the lip 74. The automatic restraining means 46, hereinafter called the device 46, has a base 78 that is mounted to the deck 32 along the center axis of the freighter 30. Since both sides of the device 46 are identical, description and illustration of one side of the device 46 will be deemed sufficient. The base 78 is further provided with guide rollers 80 which assist in keeping a container 36 bottom edge in a guided and proper direction. The upper surface of the base 78 may be provided with a seat-track portion for attaching clips or hooks when outsized or bulk cargo is carried on pallets or the like. The lip arrangement 76 is slidably mounted on an axle 82 by a complementing and enveloping spring-carrying enclosure housing 84. This housing 84 contains a spring 86 (see FIG. 13) and is sealed with respect to the axle 82 so that the spring 86 is kept free from dust and other contaminating factors, and the sliding operation of the housing 84 along the axle 82 stays operational. Above the housing 84 is pivotally mounted, by means of a nut 85 and a frictionless teflon bearing plate 87, along a substantially vertical axis, the hook-shaped member having a body and lip 74, and its rotational mounting is biasedly arranged by a leaf spring 88 (see FIGS. 13 - 15). This leaf spring 88 assures that the lip 74 is returned to a vertical restraining pocket 62 engaging position during the operation of the device 46. However, the lip arrangement 76 is also provided with an anti-rotational mechanism 90 to prevent the pivoting or rotation of the lip 74 when within the critical distance or within the parking area of the slot 62 during loading.

In general, the basic principle of the device 46 arrangement 76 comprises a self-centering pivoting lip 74 mounted on the sliding housing 84 for travelling parallel to the side of a container 36 for a critical distance in the slot 62 parking area. The leaf spring loaded restraining lip 74 will swing into the slot 62 of the container 36 and will follow or travel with the slot 62 of the loaded in-moving container 36. This action is in coordination with the same aircraft station or location of the manual adjustable side-locking means 48. The housing or the sliding body 84 is moved in the same direction as the container 36 by the force provided by the motion of the container 36 when the lip 74 contacts the container slot end or the front of the container 36 (see FIG. 5). Only when the container 36 is driven past or overrides past the parking target area 64 with the slot 62 dimension, the sliding body or housing 84 reaches the end on the axle 82 at which time the anti-rotational means is temporarily released or, in other words, rotation is allowed. Now the container force will pivot the lip 74 away over a delay or dwelling cam 92 and thereafter the complete housing 84, carrying the lip arrangement 76, will recycle to its original starting position by means of the expanding force of the spring 86. The lip arrangement 76 is ready again for the next container slot and as soon as the slot 62 arrives, the lip 74 will swing into the slot 62 and recycle the anti-rotational mechanism 90.

The operation of the device 46 is illustrated in a step-by-step fashion in FIGS. 6, and 9 through 12. FIG. 6 shows the restraining lip 74 in its original first position, and pivotal rotation of the lip 74 about the vertical axis is impossible in the direction of arrow 94 because of the anti-rotation mechanism 90 which blocks such a movement. (Note the locking member 98 hooked behind overriding stop 99.) However, rotation in the direction of arrow 96 is possible at all times. It should be noted that the direction of loading is towards the right, and unloading towards the left in the illustrations of FIGS. 6 - 23.

Figure 10:
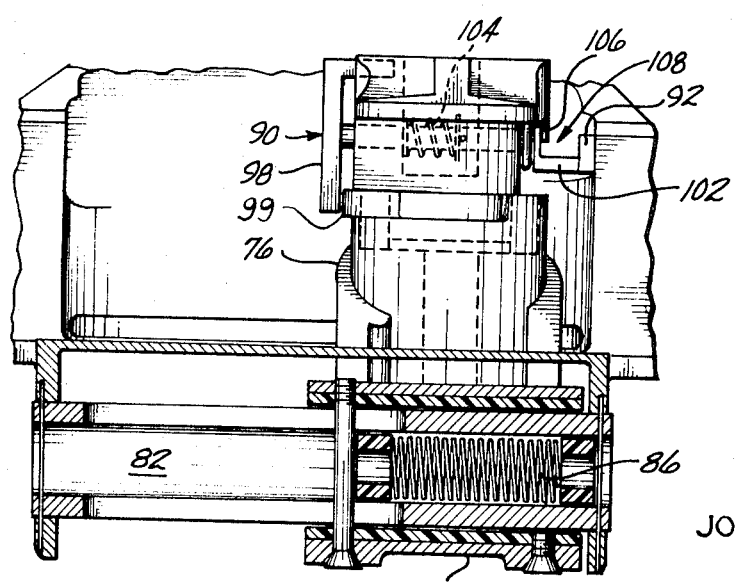
FIG. 10 is a cross-sectional view taken from FIG. 9 along line 10—10.
Figure 13:
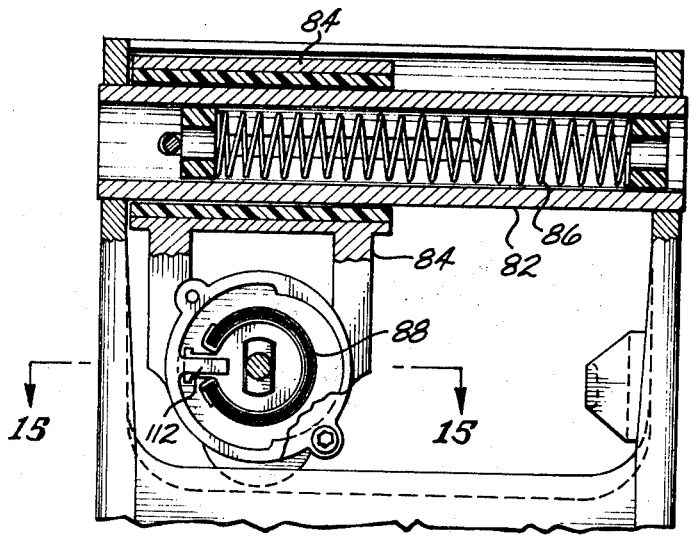
FIG. 13 is a bottom view of the restraint lip and its spring position when in a recycled extended position as shown in FIG. 6.
Figure 14:
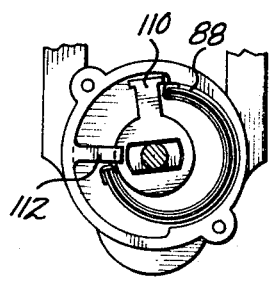
FIG. 14 is a bottom view of the restraining lip spring position when in a fully contracted position as shown in FIG. 12.
Figure 15:
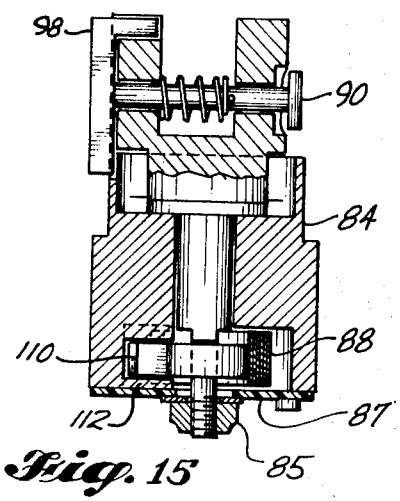
FIG. 15 is a cross-sectional view of the restraining lip mechanism taken from FIG. 13 along line 15—15.

Assuming that the cargo container 36 is entering the nose section 60, the inboard corner 100 of the container 36, or, for that matter, each pocket corner 100 (see FIG. 11) will contact the lip 74 and move the complete lip arrangement 76, which is slidably positioned on the axle 82, towards the second position shown in FIG. 9. It should be realized that either the lip 74 is pushed in front of the container 36 by the corner 100 or is within a pocket 62 of the container 36 and moved by the corner of the pocket to this second position. In either case, the spring 86 is compressed when the lip arrangement 76 is in the second position. Referring now to FIG. 11, it will be noted that the lip 74 is pivoting in the direction of the arrow 94. This pivoting is made possible by the unlocking of the anti-rotational mechanism 90. This unlocking feature is shown in FIG. 10, which is a sectional view taken from FIG. 9, and wherein the flange 102 of the delay cam 92 pushes the anti-rotational locking mechanism 90 or member 98 against its spring force 104 so that the rotation of the lip 74 in the direction of the arrow 94 is made possible because member 98 is moved to clear or override overriding stop 99. As shown now in FIG. 11, it will be noted that this rotation is guided by the pin portion 106, which is integrally connected to the lip 74, through the slot 108 of the cam 92. This guided pivotal rotation in the direction of arrow 94 by the lip 74 causes a delayed, slower returning and controlled pivoting, and, finally, the lip 74 will be rotated 90 degrees so that the pin 106 will slip from the delay cam 92 out of slot 108. Immediately the lip arrangement 76 will be pushed back by the spring 86 towards its first position. However, the lip 74 cannot rotate or return in its original vertical restraining position since the container side 100 is still preventing its return. This condition is clearly illustrated in the plan view shown in FIG. 12, and in the plan view taken at a horizontal cross-section showing the leaf spring 88 in FIG. 14. As soon as the corner 100 is past and the new pocket 62 opening or end of the container arrives, the leaf spring 88 will return the restraining lip 74 into its original vertical restraining position as shown in FIGS. 6 and 13.

Because a plurality of automatic vertical restraining devices 46 have been installed along the longitudinal center axis of the aircraft floor at about 20-inch intervals, it can be realized that the moving or travelling container causes a plurality of lips 74 to pop in and out when the pockets of the container 36 are passing by, until the intended securing position is met. During the unloading cycle, the same operation happens in reverse, except that the lip arrangement 76 will not slide away from the first position but remain in the same first position, and lip 74 will pivot in the direction of the arrow 96 each time that a pocket passes and back into each arriving pocket, etc. This free pivoting of the lip towards arrow 96 is possible since there is no anti-rotational means for the lip in the unloading direction.

Thus, during loading all the pockets 62 located at the inboard side (along the freighter 30 center line) have been automatically connected with the lips 74 and thus the container is secured in the vertical direction only along the complete inboard side. Whenever a lip 74 is in the inboard pocket 62 of the container, the pocket 62 on the outboard side is within the target area 64 and accordingly manual activation of the locking means 48 can only take place when the lips 74 are within pockets 62. It is therefore to the advantage of the system (during loading) that the lip 74 remains as long as possible in the slot 62 and thus the operation of the mechanism 90 awards the device 46 through its dwell cam 92 with an added target length in target area 64.

In general, the automatic vertical restraining device 46 for securing cargo carrying means 36 comprises a base 78 and a retraining lip arrangement 76 having 1) a housing means 84 carried by the base and adapted to move on the base in a translational reciprocating relationship between a first and a second position substantially parallel to the direction of movement of the cargo carrying means 36 during loading and unloading, and 2) cargo engaging means mounted to the housing for rotation about a substantially vertically extending axis. The cargo engaging means is provided with 1) bias means for moving the engaging means into the cargo carrying means 36 associated pocket 62 when the pocket is disposed alongside the engaging means, and 2) anti-rotational means 90 for preventing disengagement of the engaging means from the pocket during movement of the restraining lip arrangement 76 from said first to said second position during loading of the cargo carrying means 36. In addition, the device 46 comprises a release means mounted on the base for effecting release of the anti-rotational means 90 in said second position for causing disengagement of the cargo engaging means from the pocket, and force-producing means 86 mounted between the base and the housing for returning the restraining lip arrangement to said first position.

Furthermore, the cargo engaging means comprises a hook member having a body portion and a lip portion 74, and the body portion is rotationally mounted to the housing with the lip protruding outside of the housing in a substantially horizonal direction thereby enabling vertical restraint of the container 36 when engaged within the container pocket 62.

As shown in FIG. 2, the left as well as the right outboard walkway is provided with local control panels 44 and manual side-locking means 48, hereinafter called locking means 48.

Figure 16:
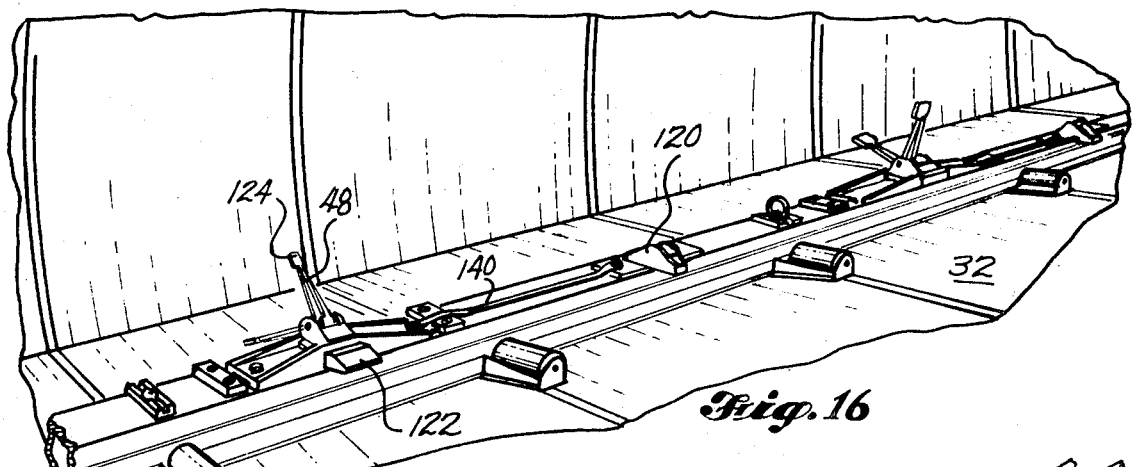
FIG. 16 is a perspective view of the side walk way on an aircraft freight deck and the arrangement of manually adjustable fore/aft locking devices with thereon-connected slaved vertical restraint devices.
Figure 17:
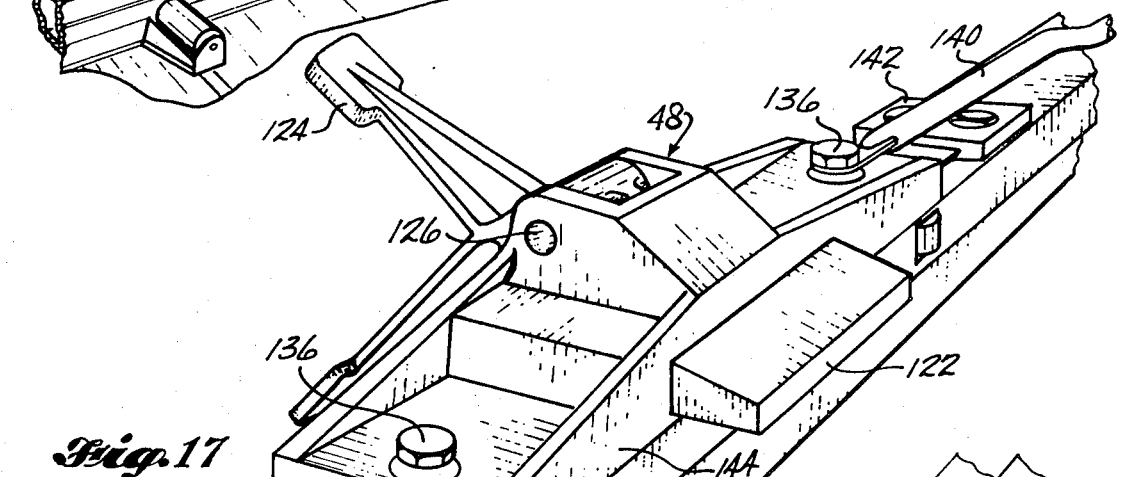
FIG. 17 is a perspective view of the manually adjustable fore/aft locking device.
Figure 18:
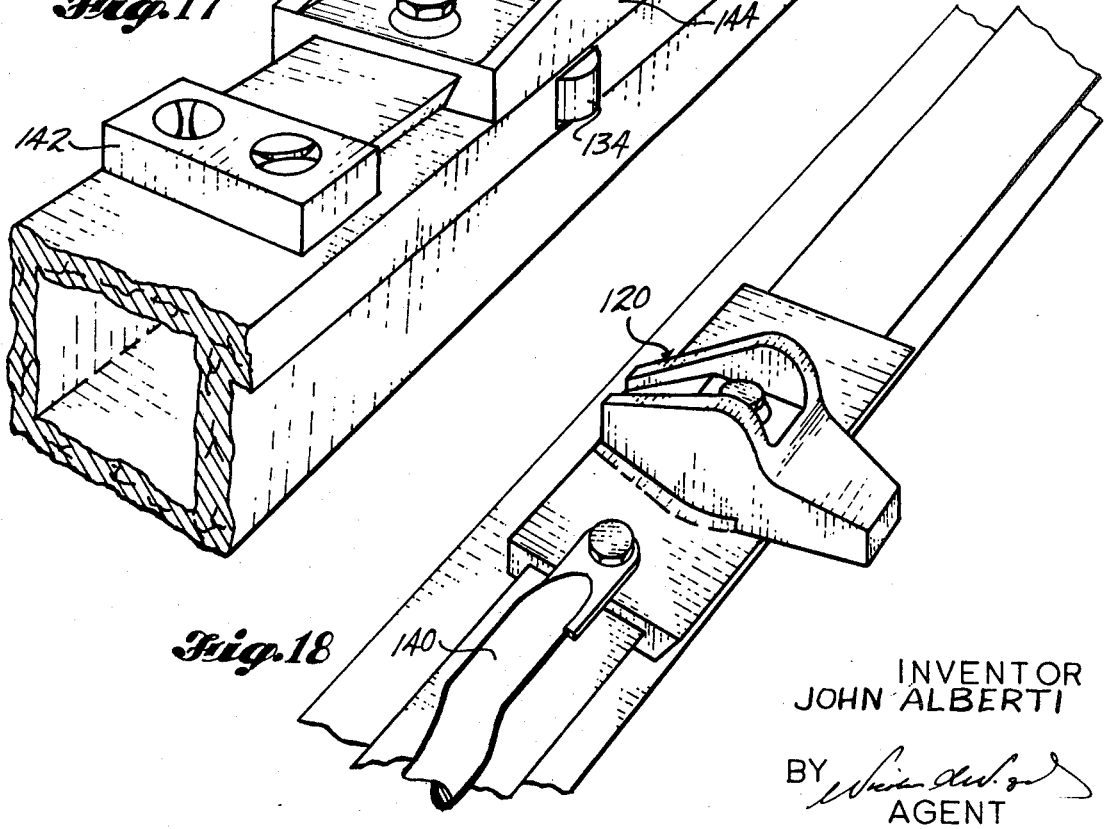
FIG. 18 is a perspective view of the slaved restraint device.

Referring now to FIGS. 16–18, the arrangement of the locking means 48 and thereon-connected slaved restraining means 120 mounted along the outboard area of the freighter 30 are illustrated in perspective fashion. The operation of the locking means 48 is shown in the cutaway perspective view shown in FIGS. 19 and 20. The lock bolt or tongue 122 is moved in or out of a cargo container pocket 62 by the manipulation of the lever 124. The lever 124 pivots on an axle 126 and has an integral crank arm portion 125 that connects through pivot pin 127 which a linkage member 128. From locking to unlocking, the crank arm 125 moves from one to another over-center position biased by the spring 130 which is connected between the lock bolt or tongue 122 and the member 128. When the lever 124 is moved in the unlocking direction, the twin lever portion 132 raises in an upward position. This arrangement is advantageous to the assistant loader since he can see immediately if the locking means 48 are in engaged or disengaged positions along the outboard side of container 36. In addition, the locking means 48 carries a plurality of rollers 134 and fastening means 136, the last ones for the connection of an interconnecting bar 140 which carries the slaved-on mounted restraining means 120. Both the locking means 48 and the slaved means 120 are slidably mounted on a rail or dovetail construction with stop members 142 at each end so that the locking means 48 has limited adjustability alongside the container pocket 62. The locking means 48 will secure the container in the vertical as well as in the horizontal direction while the slaved member 120 will automatically connect itself with a next pocket 62 and only secure in a vertical direction. When observing the views in FIGS. 19 and 20, it will become apparent that the lever motion causes the bolt 122 to move in or out of the base 144 of the locking means 48. It should also be realized that the connection with the cargo container pocket 62 is of a relatively free nature since the width of the lock bolt 122 is slightly shorter than the pocket 62 width. This and the limited slidability on the dovetail rail will cause a certain amount of free motion between the locking means 48 and the pocket 62 in fore and aft directions, which, as has been explained before, produces one of the major advantages and uniquenesses of the system as well as of the locking components. The slaved member 120 is shown in FIG. 21 in an exploded fashion, and comprises various simple components such as a leaf spring 150 which is retained between a housing 152 forming an integral part with its base member 154 and the pivoting pocket engaging member 156. The whole assembly is connected by a bolt 158 and nut 160. Free rotation of the member 156 towards the left and the right is enhanced by the frictionless sleeve 164. FIG. 22 shows the mechanical retaining of the leaf spring 150 disposed partly within member 156 and also its activating pin 162 for displacing the leaf spring 150 and for causing the member 156 to return in the self-centering position later.

In general, it should be realized that the locking means 48 locks, with limited movement, the container in a fore and aft direction.

In some particular instances it may be desirous that the small amount of free movement be limited within closer limits. In such a case the device 48 can be replaced by a substantially similar one, 180, as shown in FIG. 23.

The double-handle lever hereinafter called twin levers 182 and the linkage member 184 connected pivotally with a spring 186 arrangement for over-center actuation of the tongue 188 are identical in operation as explained for the manual side-locking means 48. In addition, the adjustable or aligning feature from device 48 is provided in the device 180 by having the unit 190 slidably arranged in the base 192. Upon alignment of the tongue 188 with the cargo container pocket 62, actuation of the lever 182 for moving the tongue 188 into the pocket 62 will move the rotationally positioned locking cams 194 through contact of the slots 196 against the cams 194 end portion 198. The convex cam portions of the cams 194 will engage with the frictional material of the side members 200 and cause a tight locking therewith.

To assure definite securing of the unit 190, the unit 190 installing blocks 202 may be provided with a similar frictional material 204 as used for the members 200. The unit 190 is enclosed by the base 192 upper cover means 206 mounted by bolts (not shown) through holes 208, complementing with the unit installing blocks 202 holes 210 and base 192 holes 212. Thus, locking of the container 36 by the device 180 requires first the step of fore and aft manual aligning and, second, the movement of the lever 182 to bring the tongue 188 in the cargo container pocket 62 engaging position, which then automatically provides for tight securing of the container in the horizontal direction without any free limited movement.

While there has been shown and described the fundamental novel method, system and features of the present invention, it will be understood that various modifications such as omissions, substitutions, changes and additions to the steps and to the components of the devices and apparatus as illustrated may be contemplated by those skilled in the art without departing from the spirit of the invention as claimed hereinafter.

I claim:

1. A fore and aft adjustable side-locking apparatus for securing with limited fore, aft and vertical freedom cargo carrying means provided with slotted pockets on aircraft, comprising:
   a. a floor-mounted rail member having a first end stop and a second end stop mounted thereon;
   b. a base member slidably mounted and retained on said rail member between said stops;
   c. a lever having a bell crank portion, a first pivot means in said lever and a second pivot in said bell crank, said lever pivotally mounted to said base member by said first pivot means;
   d. a lock bolt slidably positioned on said base member and adapted to move in a protruded position for insertion with said pocket and to move in a contracted position for disengagement from said pocket;

e. a spring-biased toggle means connecting pivotally with said bell crank second pivot means on one side and pivotally to said lock bolt on the other side;

f. a spring supported at one end to said base member and its other end to said toggle means at a location such that said spring force extends substantially perpendicularly to said second pivot means axis of rotation and a dead center toggle condition exists when said spring force extends straight through said first and said second pivot means;

g. at least one slaved-on mounted vertical restraining means;

h. a linking bar means; and i. said slaved-on restraining means is interconnected by said bar to said side-locking apparatus base.

2. A side-locking apparatus as claimed in claim 1 wherein said vertical restraining means comprises a slidable positioned and rail mounted housing carrying a spring-biased pocket engaging member for engagement to said cargo container means pocket positioned next to said lock bolt engaged pocket.

3. A fore and aft adjustable and internally self locking side-locking apparatus for securing cargo carrying means employing pockets comprising:

a. a floor mounted base;

b. a side-locking assembly unit slidably positioned on said base;

c. said unit comprising a housing and a locking tongue slidably positioned in said housing;

d. a lever having a bell crank portion, said lever pivotally mounted to said housing;

e. said locking tongue adapted to move in a protruded position for insertion with said pocket and to move in a retracted position for disengagement from said pocket;

f. a spring-biased toggle means mounted between said tongue and said lever bell crank for inducing said movements to said tongue by manual operation of said lever in locking or unlocking positions, respectively;

g. a pair of locking cams, pivotally mounted to said housing and each having an end portion, and h. said tongue provided with a pair of slots for receiving said end portions respectively so that movement of said tongue in said locking pocket engaging position will move said locking cams by way of said slots pushing said locking cams end portions whereby said locking cams' pivotal movement will clamp said housing to said base internally.

* * * * *